(12) United States Patent
Chen et al.

(10) Patent No.: US 11,815,768 B2
(45) Date of Patent: Nov. 14, 2023

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventors: Mei Chen, Shenzhen (CN); Xingwu Chen, Shenzhen (CN); Dongze Li, Shenzhen (CN); Xin Zhang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 460 days.

(21) Appl. No.: 17/049,960

(22) PCT Filed: Jun. 16, 2020

(86) PCT No.: PCT/CN2020/096309
§ 371 (c)(1),
(2) Date: Oct. 23, 2020

(87) PCT Pub. No.: WO2021/237821
PCT Pub. Date: Dec. 2, 2021

(65) Prior Publication Data
US 2023/0152636 A1    May 18, 2023

(30) Foreign Application Priority Data
May 29, 2020   (CN) .................. 202010473917.9

(51) Int. Cl.
*G02F 1/1343*   (2006.01)

(52) U.S. Cl.
CPC .... *G02F 1/134345* (2021.01); *G02F 1/13439* (2013.01)

(58) Field of Classification Search
None
See application file for complete search history.

(56) References Cited

U.S. PATENT DOCUMENTS

| 11,086,162 | B1 * | 8/2021 | Chen ................ G02F 1/133514 |
| 2004/0227890 | A1 | 11/2004 | Chung |
| 2005/0099573 | A1 * | 5/2005 | Kubo ................ G02F 1/134309 349/146 |

(Continued)

FOREIGN PATENT DOCUMENTS

| CN | 106444170 A | 2/2017 |
| CN | 109283756 A | 1/2019 |

(Continued)

*Primary Examiner* — Ryan Crockett
(74) *Attorney, Agent, or Firm* — PV IP PC; Wei Te Chung; Zhigang Ma

(57) ABSTRACT

The present disclosure discloses a display panel and a display device. The display panel includes a plurality of first electrodes positioned in a same pixel unit. The first electrodes include a first sub-electrode and a second sub-electrode. A light wavelength transmittance of a first sub-electrode is different from a light wavelength transmittance of a second sub-electrode, so as to increase a viewing angle of the display panel and solve a problem that the display panel is prone to having color shifts.

18 Claims, 11 Drawing Sheets

(56) References Cited

U.S. PATENT DOCUMENTS

| | | | | |
|---|---|---|---|---|
| 2013/0257700 A1* | 10/2013 | Chang | ............... | G02F 1/134363 |
| | | | | 345/87 |
| 2015/0070623 A1* | 3/2015 | Kang | ................ | G02F 1/134309 |
| | | | | 349/96 |
| 2016/0259218 A1* | 9/2016 | Chen | ................ | G02F 1/133707 |
| 2017/0160584 A1* | 6/2017 | Song | ...................... | G02B 5/204 |
| 2017/0235194 A1* | 8/2017 | Shin | .................... | G02F 1/13439 |
| | | | | 349/139 |
| 2019/0079325 A1* | 3/2019 | Cho | ...................... | G02F 1/1337 |
| 2021/0165288 A1* | 6/2021 | Chen | ..................... | G02F 1/1393 |

FOREIGN PATENT DOCUMENTS

| | | |
|---|---|---|
| CN | 110794625 A | 2/2020 |
| CN | 110794626 A | 2/2020 |
| CN | 110824789 A | 2/2020 |
| CN | 110955085 A | 4/2020 |

\* cited by examiner

DISPLAY PANEL AND DISPLAY DEVICE

This application is a Notional Phase of PCT Patent Application No. PCT/CN2020/096309 having international filing date of Jun. 16, 2020, which claims priority to Chinese Patent Application with the application No. 202010473917.9 filed on May 29, 2020 with the National Intellectual Property Administration, the disclosure of which is incorporated by reference in the present application in its entirety.

FIELD OF INVENTION

The present disclosure relates to a field of display technologies, and more particularly to a display panel and a display device.

BACKGROUND OF INVENTION

Chiral compounds are added to negative nematic host liquid crystals in chiral vertically-aligned liquid crystal display device, so that the liquid crystal molecules reversibly switch between a vertical orientation state (dark state) and a planar twist state (bright state) to suppress color dispersion, reduce dark lines between domains effectively, and improve transmittance. In order to meet the maximum requirement of the transmittance, an optical path difference of the chiral liquid crystal molecules is large, which causes the display device to be prone to the problems of color shift in viewing angles and narrow viewing angles.

SUMMARY OF INVENTION

Technical Problems

Embodiments of the present disclosure provide a display panel and a display device, which can solve the problems of color shift in viewing angles and narrow viewing angles.

An embodiment of the present disclosure provides a display panel, comprising:

a plurality of first electrodes positioned in a same pixel unit, wherein the first electrodes comprise a first sub-electrode and a second sub-electrode, and a light wavelength transmittance of the first sub-electrode is different from a light wavelength transmittance of the second sub-electrode.

In the display panel, the first sub-electrode comprises a first main electrode and a plurality of first branched electrodes connected to the first main electrode, a first included angle is formed between the first branched electrodes and the first main electrode; the second sub-electrode comprises a second main electrode and a plurality of second branched electrodes connected to the second main electrode, and a second included angle are formed between the second branched electrodes and the second main electrode; wherein the first included angle is different from the second included angle.

In the display panel, the first included angle is equal to $\theta\pm\alpha$; the second included angle is equal to $\theta$; wherein $\theta$ is the best included angle when the display panel has the best transmittance, and $\alpha$ is an angle margin.

In the display panel, the first sub-electrode comprises a first domain and a second domain that are adjacent to each other, a third included angle formed between the first branched electrode and the first main electrode within the first domain, and a fourth included angle formed between the first branched electrode within the second domain and the first branched electrode within the first domain; wherein the third included angle is equal to the first angle.

In the display panel, the fourth included angle is equal to 90°; or the fourth included angle is equal to 90°±2α; or the fourth included angle is equal to 180° minus twice the first angle.

In the display panel, the first sub-electrode comprises a third domain and a fourth domain that are adjacent to each other, the third domain and the second domain are positioned in a same column, the fourth domain and the first domain are positioned in a same column, an included angle between the first branched electrode and the first main electrode within the third domain is equal to the third included angle, and an included angle between the first branched electrode and the first main electrode within the fourth domain is equal to an included angle between the first branched electrode and the first main electrode within the second domain.

In the display panel, the second sub-electrode comprises a first domain and a second domain that are adjacent to each other, a fifth included angle formed between the second branched electrode and the second main electrode within the first domain, and a sixth included angle formed between the second sub-electrode within the second domain and the second sub-electrode within the first domain; wherein the fifth included angle is equal to the second included angle.

In the display panel, the sixth included angle is equal to 90°.

In the display panel, the second sub-electrode comprises a third domain and a fourth domain that are adjacent to each other, the third domain and the second domain are positioned in a same column, the fourth domain and the first domain are positioned in a same column, an included angle between the second branched electrode and the second main electrode within the third domain is equal to the fifth included angle, and an included angle between the second branched electrode and the second main electrode within the fourth domain is equal to an included angle between the second branched electrode and the second main electrode within the second domain.

In the display panel, the first electrodes comprise a third sub-electrode, the third sub-electrode comprises a third main electrode and a plurality of third branched electrodes connected to the third main electrode, and the third branched electrodes and the third main electrode comprises a seventh included angle, the seventh included angle is equal to $\theta\pm\gamma$, wherein $0°\leq\gamma\leq10°$.

In the display panel, the third sub-electrode comprises a first domain and a second domain that are adjacent to each other and a third domain and a fourth domain that are adjacent to each other, the third domain and the second domain are positioned within a same column, the fourth domain and the first domain are positioned in a same column, an eighth included angle is formed between the third branched electrodes and the third main electrode within the first domain, the eighth included angle is equal to $\theta$, a ninth included angle is formed between the third branched electrode within the second domain and the third branched electrode within the first domain, the ninth angle is equal to 90°, an included angle between the third branched electrodes and the third main electrode within the third domain is equal to the eighth angle, an included angle between the third branched electrodes and the third main electrode within the fourth domain is equal to an included angle between the third branched electrodes and the third main electrode within the second domain.

In the display panel, $0°\leq\theta\leq30°$, or $60°\leq\theta\leq90°$; and $0°<\alpha\leq10°$.

In the display panel, the first included angle is equal to θ and the second included angle is equal to θ±β; wherein θ is the best angle when the display panel has the best transmittance, and β is an angle margin.

In the display panel, the first included angle is equal to θ±α and the second included angle is equal to θ±β; wherein θ is the best angle when the display panel has the best transmittance, and α and β are angle margins.

In the display panel, the display panel is a liquid crystal display panel, the display panel further comprises:

a first substrate, wherein the first electrode is positioned on a side of the first substrate;

a second substrate positioned opposite to the first substrate and maintaining a first distance from the first substrate;

a liquid crystal positioned between the first substrate and the second substrate, and a twist angle of the liquid crystal is greater than or equal to 50° and less than or equal to 90°.

In the display panel, the first distance is greater than or equal to 2 micrometers and less than or equal to 5 micrometers.

In the display panel, a pitch of the liquid crystal is greater than or equal to 5 micrometers and less than or equal to 25 micrometers.

The present disclosure further provides a display device, comprising a display panel, wherein the display panel comprises:

a plurality of first electrodes positioned in a same pixel unit, the first electrodes comprising a first sub-electrode and a second sub-electrode, and a light wavelength transmittance of the first sub-electrode is different from a light wavelength transmittance of the second sub-electrode.

In the display panel, the first sub-electrode comprises a first main electrode and a plurality of first branched electrodes connected to the first main electrode, a first included angle is formed between the first branched electrodes and the first main electrode; the second sub-electrode comprises a second main electrode and a plurality of second branched electrodes connected to the second main electrode, and a second included angle are formed between the second branched electrodes and the second main electrode; wherein the first included angle is different from the second included angle.

In the display panel, the first included angle is equal to θ±α; the second included angle is equal to θ; wherein θ is the best included angle when the display panel has the best transmittance, and α is an angle margin.

Beneficial effects:

Compared with the prior art, for a display panel and a display device provided by the embodiments of the present disclosure, the display panel includes a plurality of first electrodes positioned in a same pixel unit. The first electrodes include a first sub-electrode and a second sub-electrode. A light wavelength transmittance of a first sub-electrode is different from a light wavelength transmittance of a second sub-electrode, so as to increase a viewing angle of the display panel and solve a problem that the display panel is prone to having color shifts.

DETAILED DESCRIPTION OF PREFERRED EMBODIMENTS

In order to make purposes, technical solutions, and effects of the application to be clearer and more specific, the present disclosure is further described with reference to the drawings and examples. It is to be understood that the specific embodiments described herein are only used to explain the present disclosure, and are not intended to limit the present disclosure.

Figure 1:
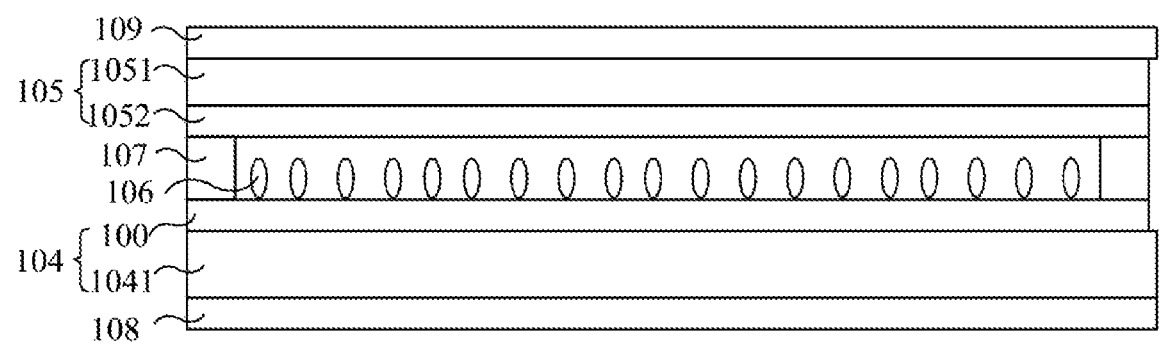
FIG. 1 is a schematic structural diagram of a display panel provided by an embodiment of the present disclosure.
Figure 2A:
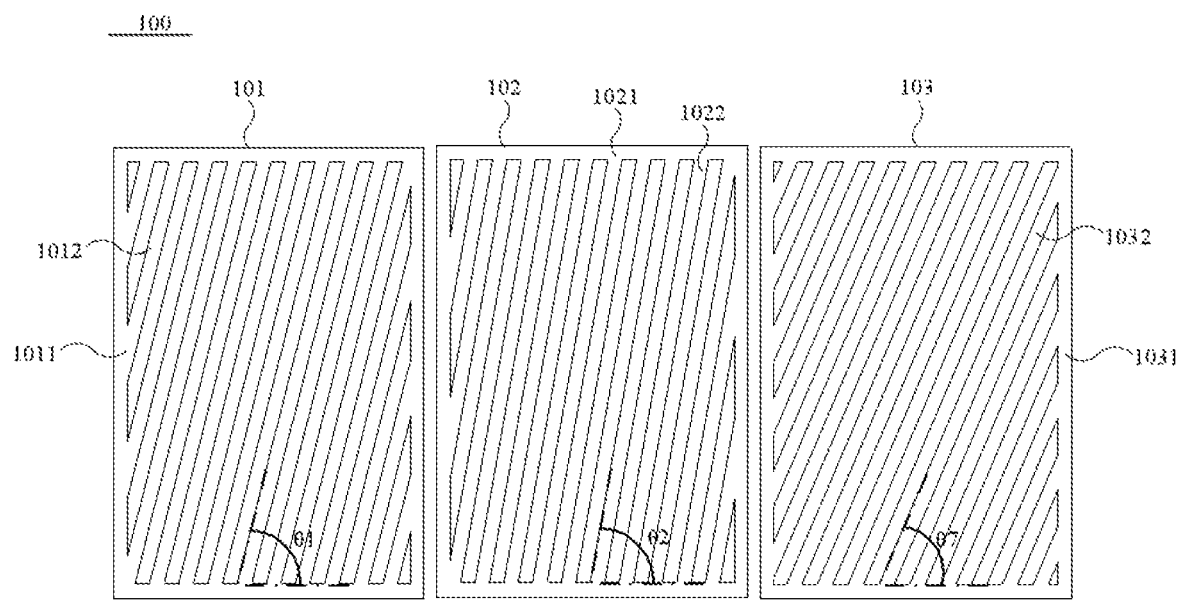
FIGS. 2A-2B are schematic structural diagrams of a first electrode provided by an embodiment of the present disclosure.
Figure 2B:
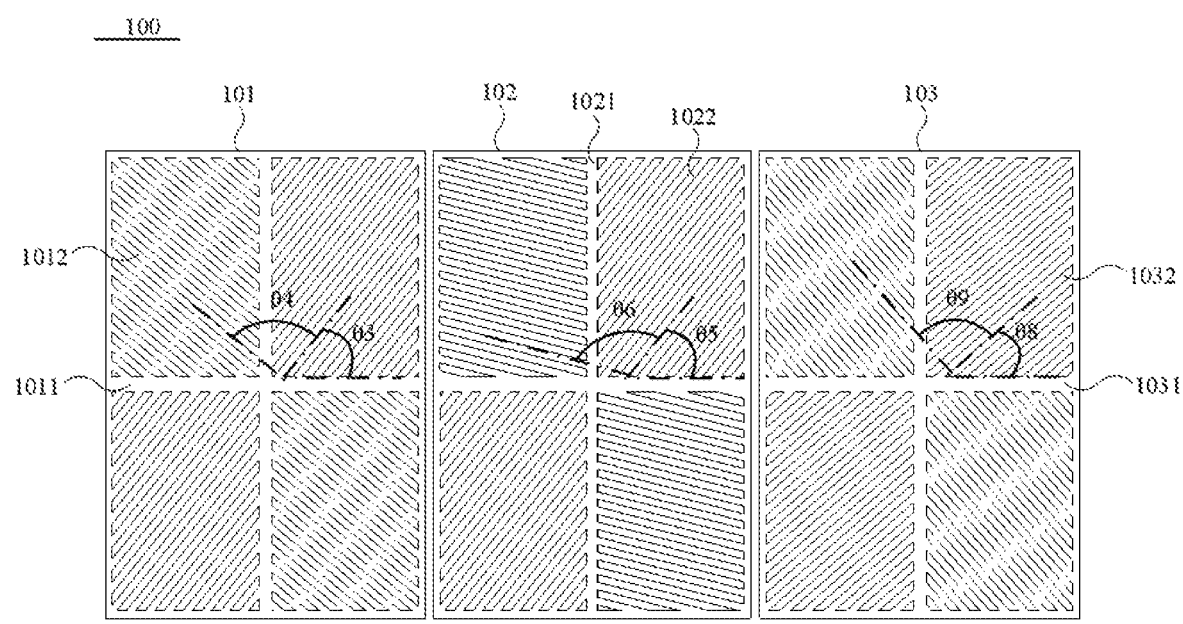

Specifically, please refer to FIG. 1, which is a schematic structural diagram of a display panel provided by an embodiment of the present disclosure. FIGS. 2A to 2B which are schematic structural diagrams of a first electrode provided by an embodiment of the present disclosure. The display panel includes the following:

a plurality of first electrodes 100 positioned in a same pixel unit. The first electrodes 100 comprise a first sub-electrode 101 and a second sub-electrode 102. A light wavelength transmittance of the first sub-electrode 101 is different from a light wavelength transmittance of the second sub-electrode 102, which broadens the viewing angle of the display panel and solves the problem that the display panel is prone to having color shift.

Specifically, the first sub-electrode 101 includes a first main electrode 1011 and a plurality of first branched electrode 1012 connected to the first main electrode 1011. The first branched electrode 1012 and the first main electrode 1011 has a first angle θ1. The second sub-electrode 102 includes a second main electrode 1021 and a plurality of second branched electrodes 1022 connected to the second main electrode 1021. A second included angle θ2 is formed between the second branched electrode 1022 and the second main electrode 1021. The first angle θ1 is different from the second included angle θ2, so that a difference is formed between a transmittance of light wavelength of the first sub-electrode 101 and a transmittance of light wavelength of the second sub-electrode 102, thereby solving problems of the viewing angle and color shift of the display panel.

Furthermore, a first included angle θ1 is equal to θ±α. A second included angle θ2 is equal to θ. θ is an optimal included angle when the display panel has the best transmittance. α is an angle margin to reduce an optical path difference of the first sub-electrode 101, thereby solving the viewing angle and color shift of the display panel.

In which 0°≤θ≤30°; or 60°≤θ≤90°; and 0°<α≤10°. Specifically, θ=0°, 3°, 5°, 8°, 10°, 15°, 19°, 20°, 23°, 25°, 27°, or 30°; or 0=60°, 62°, 65°, 67°, 69°, 70°, 75°, 79°, 80°, 83°, 85°, 88°, or 90°. Specifically, α=1°, 2°, 3°, 5°, 7°, 9°, or 10°.

Similarly, the first included angle θ1 is equal to θ and the second included angle θ2 is equal to θ±β, so that a difference is formed between a transmittance of light wavelength of the first sub-electrode 101 and a transmittance of light wavelength of the second sub-electrode 102. Furthermore, the first included angle θ1 is equal to θ±α and the second included angle θ2 is equal to θ-43, so that a difference is formed between a transmittance of light wavelength of the first sub-electrode 101 and a transmittance of light wavelength of the second sub-electrode 102. $\beta$ is an angle margin and $0°<\beta\geq 10°$. Specifically, $\beta=1°, 2°, 3°, 5°, 7°, 9°,$ or $10°$.

Please continue to refer to FIGS. 2A-2B. The first electrodes 100 further includes a third sub-electrode 103. The third sub-electrode 103 includes a third main electrode 1031 and a plurality of third branched electrodes 1032 connected to the third main electrode 1031. A seventh included angle $\theta 7$ is formed between the third branched electrode 1032 and the third main electrode 1031. The seventh included angle $\theta 7$ is equal to $\theta\pm\gamma$, where $0°\leq\gamma\leq 10°$, and $\gamma$ is an angle margin. Specifically, $\gamma=0°, 2°, 3°, 5°, 7°, 9°,$ or $10°$.

Furthermore, when the first included angle $\theta 1$ of the first sub-electrode 101 and/or the second included angle $\theta 2$ of the second sub-electrode 102 are different from the optimal included angle $\theta$, the seventh included angle $\theta 7$ of the third sub-electrode 103 may be equal to the optimal included angle $\theta$, so that a difference is formed between the transmittances of the light wavelength of the first sub-electrode 101, the second sub-electrode 102, and the third sub-electrode 103. That is, an included angle between at least one branched electrode and the main electrode of the sub-electrode of the first electrode 100 is different from the optimal included angle $\theta$, so that the optical path difference is reduced, thereby solving problems of the viewing angle and color shift of the display panel.

Specifically, when the first included angle $\theta 1$ is equal to $\theta$ and the second included angle $\theta 2$ is equal to $\theta\pm\beta$; or when the first included angle $\theta 1$ is equal to $\theta\pm\alpha$, the second included angle $\theta 2$ is equal to $\theta$; or when the first included angle $\theta 1$ is equal to $\theta\pm\alpha$ and the second included angle $\theta 2$ is equal to $\theta$-4. The seventh included angle $\theta 7$ may be equal to the optimal included angle $\theta$.

Similarly, the seventh included angle $\theta 7$ of the third sub-electrode 103 may be equal to the first included angle $\theta 1$ of the first sub-electrode 101; or the seven included angle $\theta 7$ of the third sub-electrode 103 may be equal to the second included angle $\theta 2$ of the second sub-electrode 102. Furthermore, the first included angle $\theta 1$ is equal to $\theta\pm\alpha$, the second included angle $\theta 2$ is equal to $\theta$-43, and the seventh included angle $\theta 7$ is equal to $\theta\pm\gamma$.

The first sub-electrode 101, the second sub-electrode 102, and the third sub-electrode 103 are used for forming a red sub-pixel, a green sub-pixel, and a blue sub-pixel. In practical applications, a brightness of the blue sub-pixel will be higher than a brightness of the red and green sub-pixels, so the sub-electrode forming the blue sub-pixel may have an included angle different from the optimal included angle $\theta$ to increase the viewing angle and solve the color swift. That is, if the first sub-electrode 101 forms a blue sub-pixel, the second sub-electrode 102, and the third sub-electrode 103 form a red sub-pixel and a green sub-pixel, the first included angle $\theta 1$ is equal to $\theta\pm\alpha$, the second included angle $\theta 2$ is equal to $\theta$, the seventh included angle $\theta 7$ is equal to $\theta$, so the sub-electrode forming the blue sub-pixel may have an included angle different from the optimal included angle $\theta$ to increase the viewing angle and solve the color swift. When the optimal included angle $\theta=75°$, and the angle margin $\alpha=5°$, the first included angle $\theta 1$ is equal to $70°$ or $80°$, the second included angle $\theta 2$ is equal to $\theta$ and equal to $75°$, and the seventh included angle $\theta 7$ is equal to $\theta$ and equal to $75°$, so that the first electrode 100 of the pixel unit has a higher difference in light wavelength transmittance, thereby increasing viewing angles and solving color swifts.

Understandably, the first electrode 100 may further include a plurality of sub-electrodes such as a fourth sub-electrode and a fifth sub-electrode. The arrangement of the sub-electrodes is similar to the arrangement of the first sub-electrode 101, the second sub-electrode 102, and the third sub-electrode 103, which are not described in detail herein.

In the first electrode 100 shown in FIG. 2A is described as a structure in which the first sub-electrode 101, the second sub-electrode 102, and the third sub-electrode 103 are served as a single-domain. In the actual application, the first electrode 100 will also employ a multi-domain design to increase the viewing angle and solve the color shift. Specifically, please continue to refer to FIGS. 2B and 3A-3H, FIGS. 3A-3E are schematic structural diagrams of the first sub-electrode provided by the embodiment of the present disclosure. FIGS. 3F-3G are schematic structural diagrams of second sub-electrodes provided by an embodiment of the present disclosure. FIG. 3H is a schematic structural diagram of a third sub-electrode provided by an embodiment of the present disclosure.

Please continue to refer to FIGS. 3A-3E, the first sub-electrode 101 includes adjacent first domains 101$a$ and second domains 101$b$. The first branched electrode 1012$a$ and the first main electrode 1011 has a third included angle $\theta 3$. The first branched electrode 1012$b$ within the second domain 101$b$ and the first branched electrode 1012$b$ within the first domain 101$a$ have a fourth included angle $\theta 4$. In which, the third included angle $\theta 3$ is equal to the first included angle $\theta 1$, so that the first sub-electrode 101 has different light wavelength transmittances in the first domain 101$a$ and the second domain 101$b$, thereby increasing viewing angles and solving color swifts.

The first main electrode 1011 includes first main electrodes 1011$a$ and 1011$b$ that are arranged crosswise. The third included angle $\theta 3$ is an included angle between the first branched electrode 1012$a$ and the first main electrode 1011$a$ within the first domain 101$a$.

Furthermore, when the third included angle $\theta 3$ is equal to the first included angle $\theta 1$ and equal to $\theta\pm\alpha$, the fourth included angle $\theta 4$ is equal to $90°$; or the fourth included angle $\theta 4$ is equal to $90°\pm 2a$; or the fourth included angle $\theta 4$ is equal to $180°$ minus 2 times the first included angle $\theta 1$.

Similarly, when the third included angle $\theta 3$ is equal to the first included angle $\theta 1$ and equal to $\theta$, the fourth included angle $\theta 4$ is equal to $90°$, so that the third included angle $\theta 3$ of the first domain 101$a$ is different from the fourth included angle $\theta 4$, so that the first sub-electrode 101 has different light wavelength transmittances in the first domain 101$a$ and the second domain 101$b$.

Furthermore, the first sub-electrode 101 includes adjacent third domains 101$c$ and fourth domains 101$d$. The third domain 101$c$ and the second domain 101$b$ are positioned in the same column. The fourth domain 101$d$ and the first domain 101$a$ is positioned in the same column. An included angle between the first branched electrode 1012$c$ and the first main electrode 1011$a$ within the third domain 101$c$ is equal to the third included angle $\theta 3$. An included angle between the first branched electrode 1012$d$ and the first main electrode 1011$a$ within the second domain 101$d$ is equal to an included angle between the first branched electrode 1012$b$ and the first main electrode 1011$a$ within the second domain 101$b$.

Figure 3A:
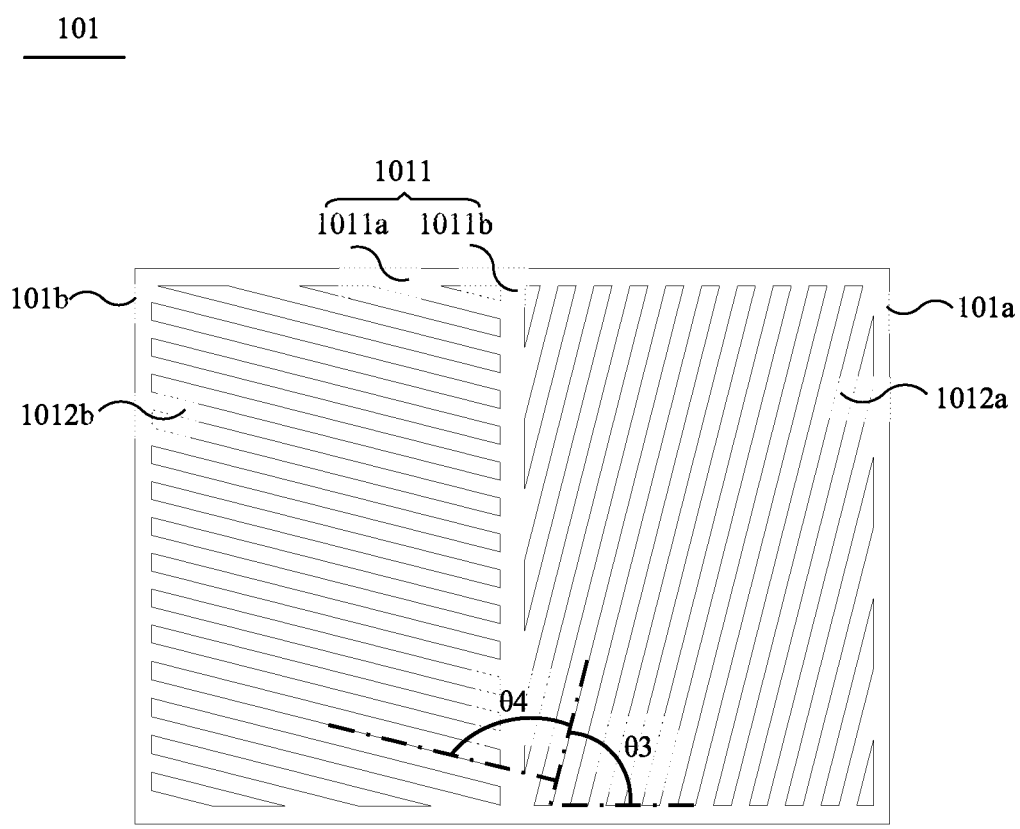
FIGS. 3A-3E are schematic structural diagrams of a first sub-electrode provided by an embodiment of the present disclosure.
Figure 3B:
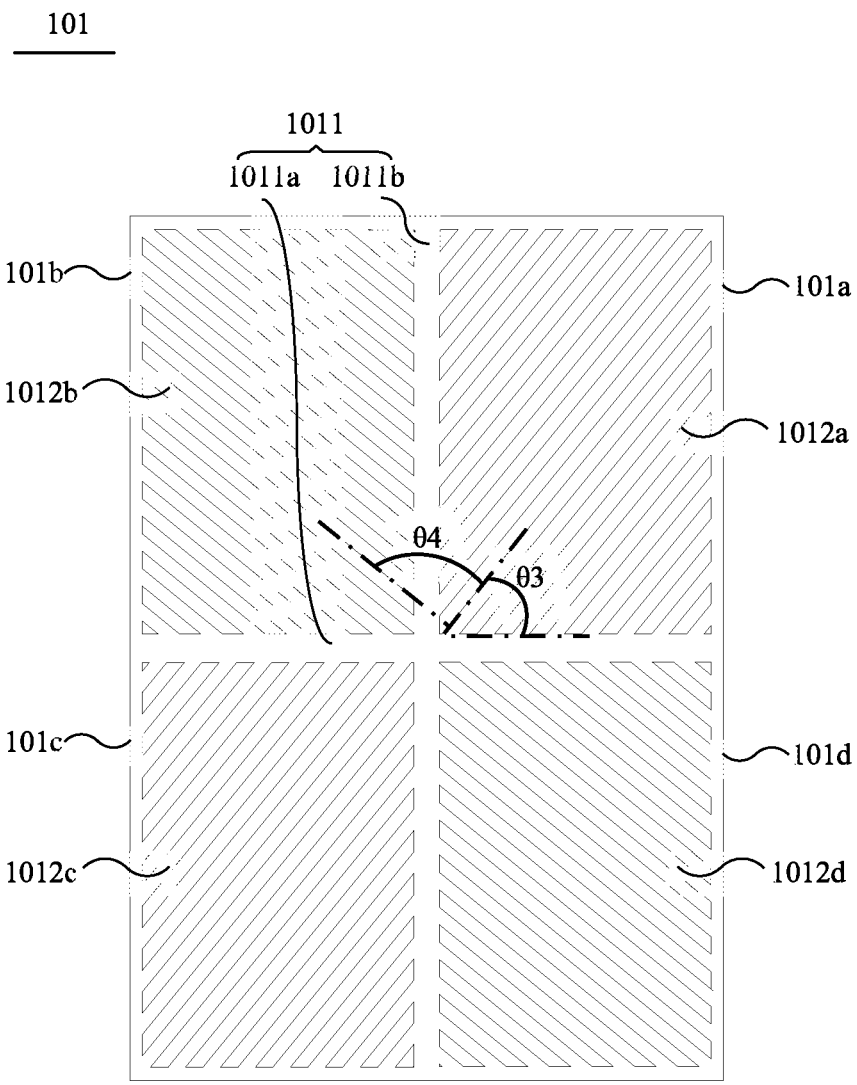
Figure 3C:
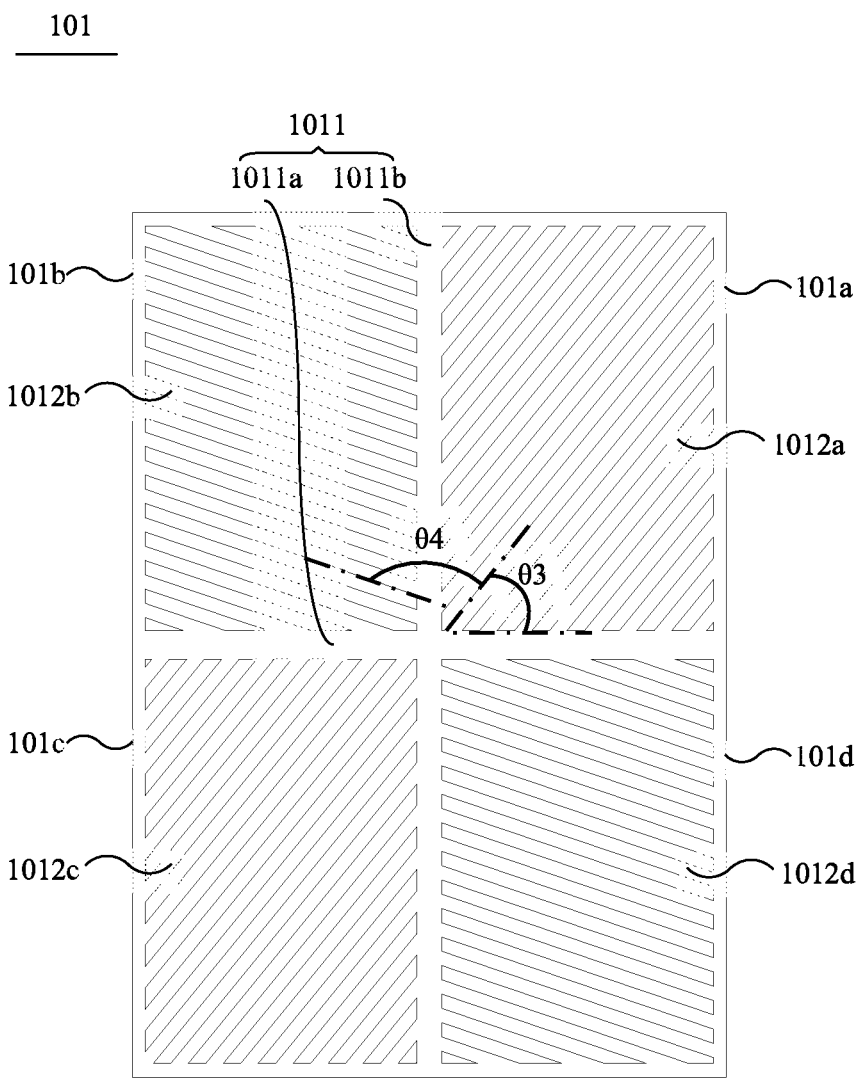
Figure 3D:
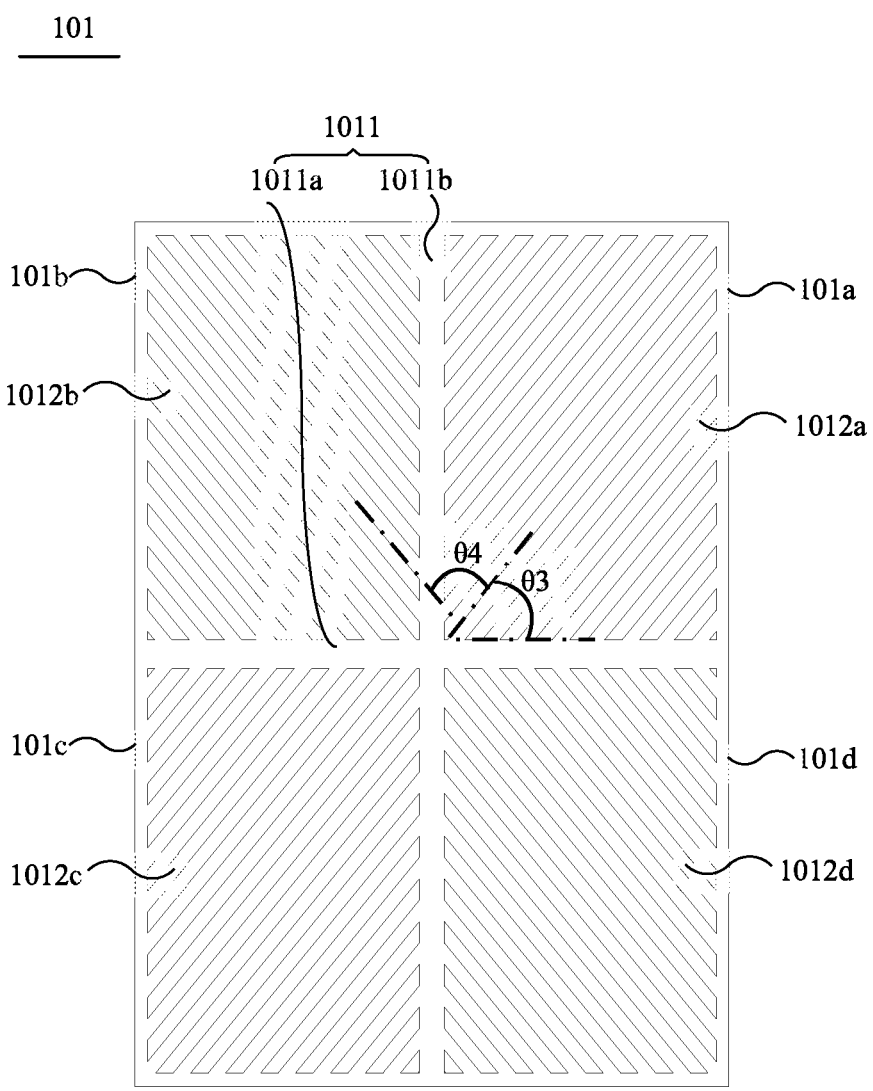
Figure 3E:
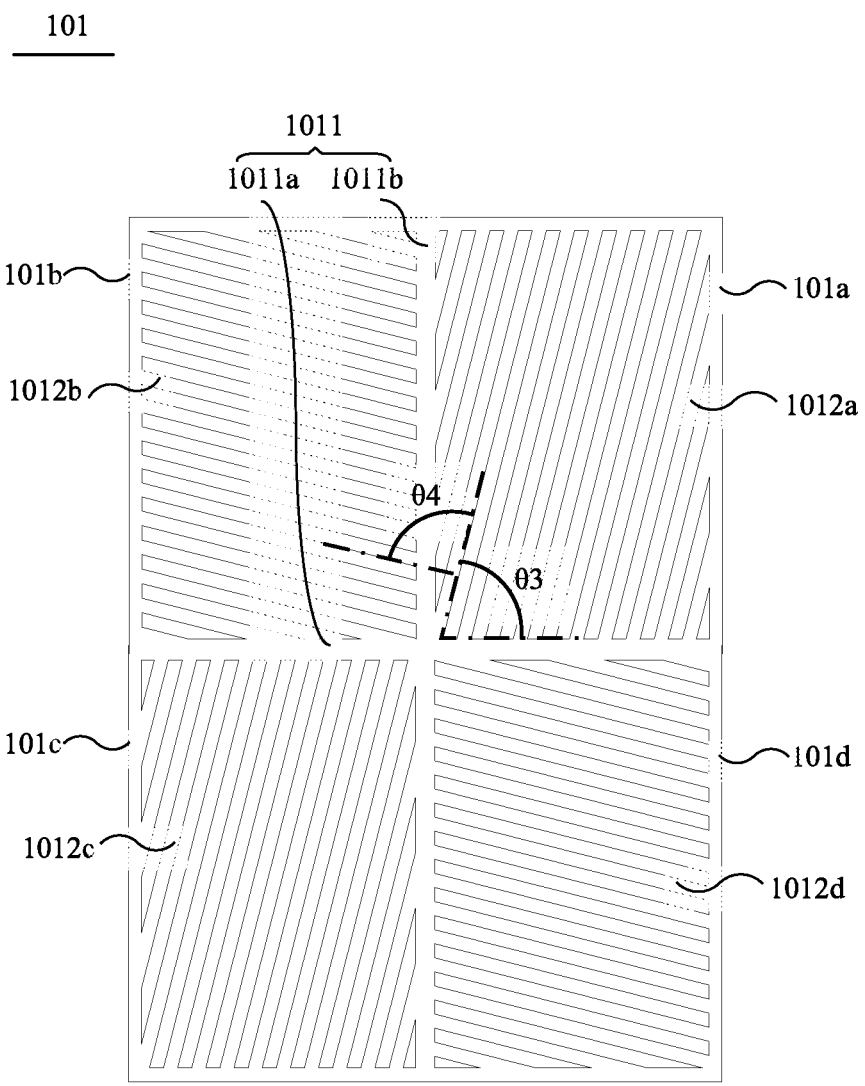
Figure 3F:
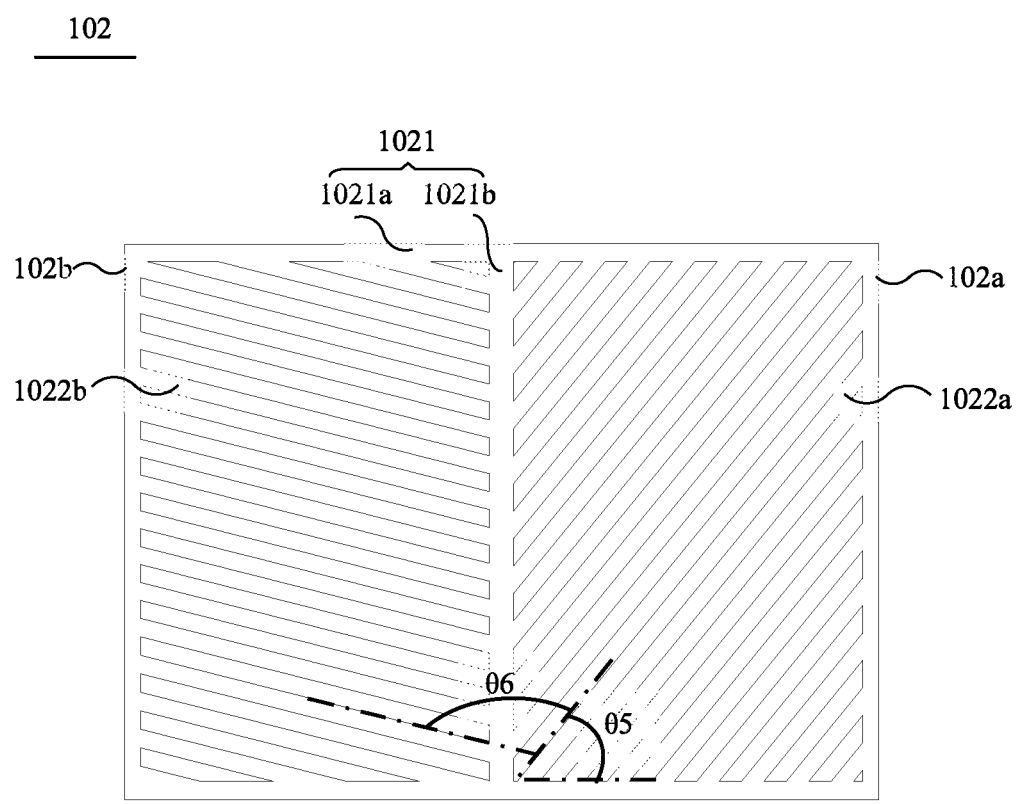
FIGS. 3F-3G are schematic structural diagrams of second sub-electrodes provided by an embodiment of the present disclosure.
Figure 3G:
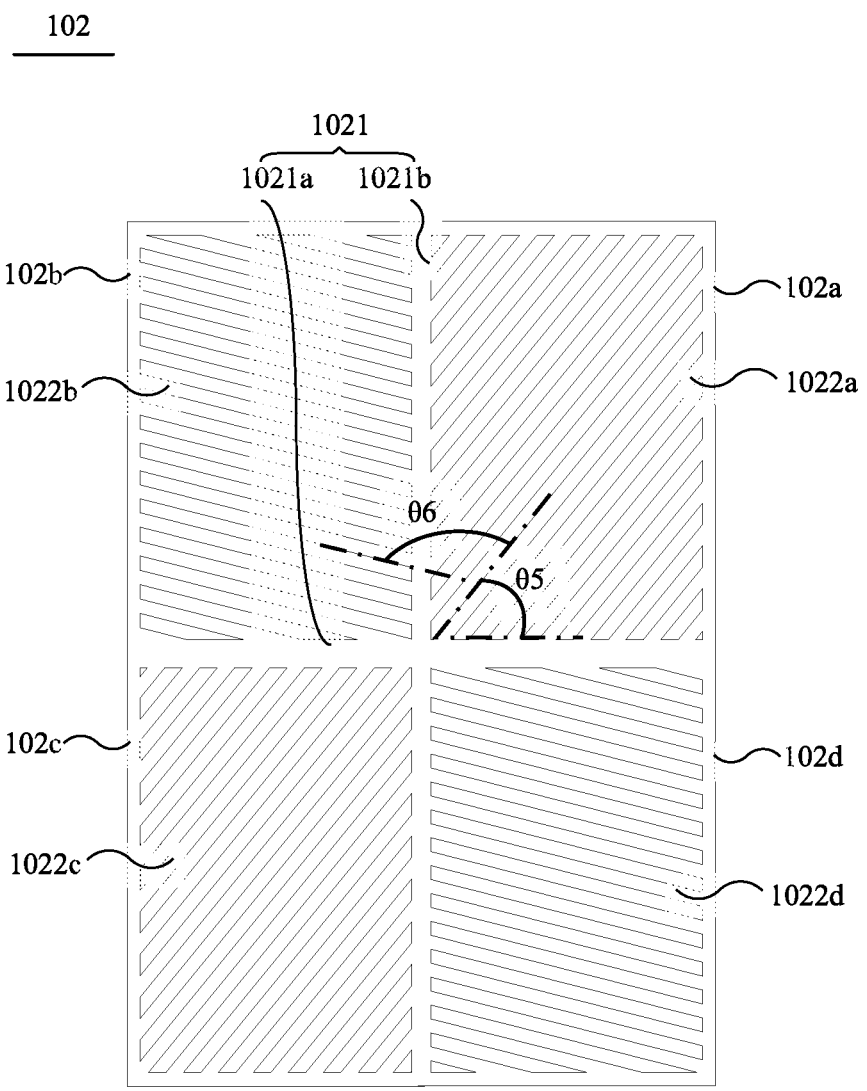
Figure 3H:
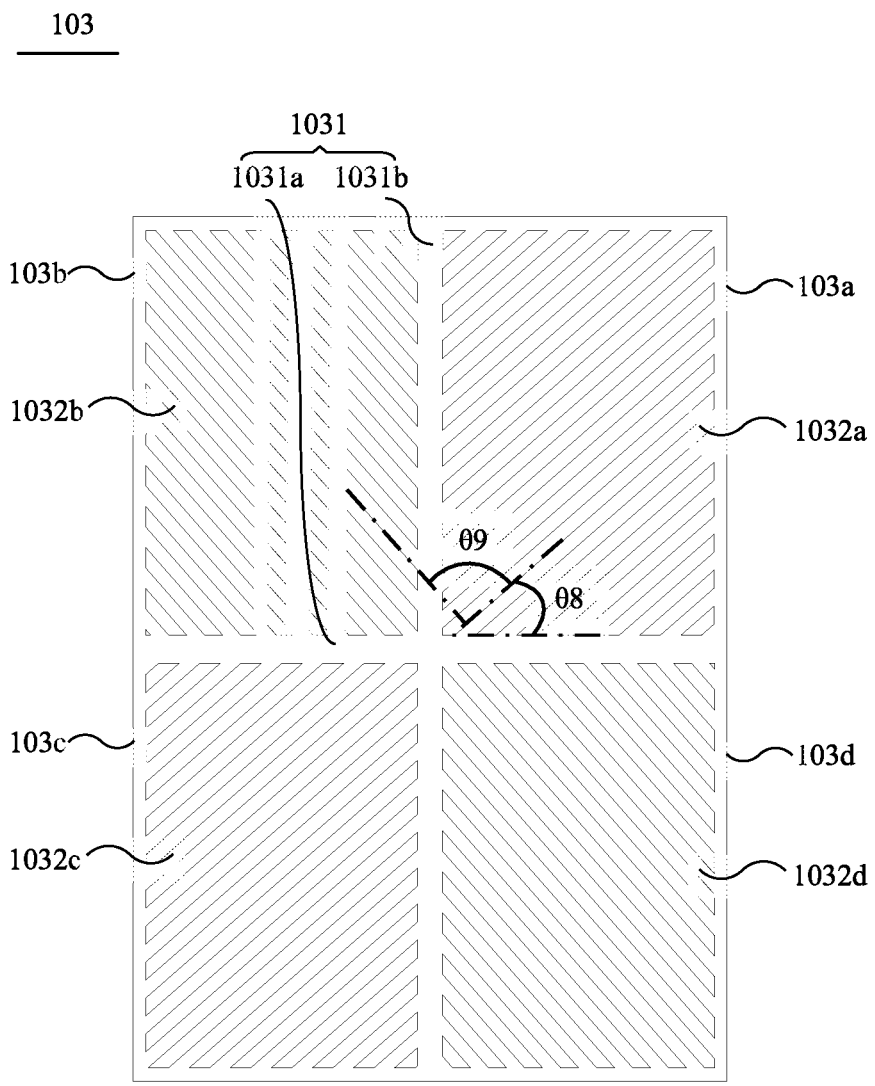
FIG. 3H is a schematic structural diagram of a third sub-electrode provided by an embodiment of the present disclosure.

FIG. 3A is a schematic structural view of the first sub-electrode 101 designed as two domains, and FIGS. 3B to 3E are schematic structural views of the first sub-electrode 101 designed for four domains. In the first sub-electrode 101 shown in FIGS. 3B to 3D, the third included angle $\theta 3$ is equal to the first included angle $\theta 1$ is equal to $\theta\pm\alpha$. The fourth included angle $\theta 4$ is equal to $90°$, as shown in 3B. The fourth angle θ4 is equal to 90°±2α, as shown in FIG. 3C. The fourth angle θ4 is equal to 180° minus 2 times the first angle θ1, as shown in FIG. 3D. In the first sub-electrode 101 shown in FIG. 3E, the third included angle θ3 is equal to the first included angle θ1 and equal to θ, and the fourth included angle θ4 is equal to 90°.

Furthermore, an included angle between the first branched electrode 1012 and the first main electrode 1011 in at least one domain of the first sub-electrode 101 is different from the optimal included angle θ, so that the first sub-electrode 101 has different light wavelength transmittance in each domain.

Please continue to refer to FIGS. 3F-3G, the second sub-electrode 102 includes an adjacent first domain 102a and a second domain 102b. The second branched electrode 1022a and the second main electrode 1021 within the first domain 102a has a fifth included angle θ5. The second branched electrode 1022b within the second domain 102b and the second branched electrode 1022a within the first domain 102a have a sixth included angle θ6. The fifth included angle θ5 is equal to the second included angle θ2.

The second main electrode 1021 includes second main electrodes 1021a and 1021b that are arranged crosswise. The fifth included angle θ5 is an included angle between the second branched electrode 1022a and the second main electrode 1021a within the first domain 102a.

Furthermore, when the fifth included angle θ5 is equal to the second included angle θ2 and equal to θ±β; the sixth included angle θ6 is equal to 90°; or the sixth included angle θ6 is equal to 90°±2β; or the sixth included angle θ6 is equal to 180° minus 2 times the second included angle θ2.

Similarly, when the fifth included angle θ5 is equal to the second included angle θ2 and equal to θ, the sixth included angle θ6 is equal to 90°, so that the fifth included angle θ5 within the first domain 102a is different from the sixth included angle θ6, so that the second sub-electrode 102 has different light wavelength transmittances in the first domain 102a and the second domain 102b.

Furthermore, the second sub-electrode 102 includes adjacent third domains 102c and fourth domains 102d. The third domains 102c and the second domains 102b are positioned in the same column. The fourth domains 102d and the first domain 102a are positioned in the same column. An included angle between the second branched electrode 1022c and the second main electrode 1021a within the third domain 102c is equal to the fifth included angle θ5. An included angle between the second branched electrode 1022d and the second main electrode 1021a within the fourth domain 102d is equal to an included angle between the second branched electrode 1022b and the second main electrode 1021a within the second domain 102b, as shown in FIG. 3G.

Understandably, in the case that both the first sub-electrode 101 and the second sub-electrode 102 have multiple domains, the included angle between the first branched electrode 1012 and the first main electrode 1011 within at least one domain of the first sub-electrode 101 is different from an included angle between the second branched electrode 1022 and the second main electrode 1021 within at least one domain in the second sub-electrode 102. A transmittance of the light wavelength of the first sub-electrode 101 is different from a transmittance of the light wavelength of the second sub-electrode 102.

Furthermore, the included angle between the first branched electrode 1012 and the first main electrode 1011 within at least one domain of the first sub-electrode 101 is different from the optimal included angle θ; and/or the included angle between the second branched electrode 1022 and the second main electrode 1021 within at least one domain of the second sub-electrode 102 is different from the optimal included angle θ to reduce the optical path difference, increase the viewing angle of the display panel, and solve the color shift problem of the display panel.

Please continue to refer to FIG. 3H, the third sub-electrode 103 includes a first domain 103a and a second domain 103b that are adjacent to each other, and a third domain 103c and a fourth domain 103d that are adjacent to each other. The third domain 103c and the second domain 103b are positioned in the same column. The fourth domain 103d and the first domain 103a are positioned in the same column. The third branched electrode 1032a and the third main electrode 1031 within the first domain 103a has an eighth included angle θ8. The eighth included angle θ8 is equal to θ. The third branched electrode 1032b within the second domain 103b and the third branched electrode 1032a within the first domain 103a have a ninth included angle θ9. The ninth included angle θ9 is equal to 90°. An included angle between the third branched electrode 1032c and the third main electrode 1031 within the third domain 103c is equal to the eighth included angle θ8. An included angle between the third branched electrode 1032d and the third main electrode 1032d within the fourth domain 103d is equal to an included angle between the third branched electrode 1032b and the third main electrode 1031 within the second domain 103b.

The third main electrode 1031 includes a plurality of main electrodes 1031a and 1031b that are arranged crosswise. The eighth angle θ8 is an included angle between the third branched electrode 1032a and the third main electrode 103 within the first domain 103a.

Similar to the case where the first sub-electrode 101 and the second sub-electrode 102 have multiple domains, in the third sub-electrode 103, the eighth included angle θ8 may also be equal to the seventh included angle θ7. That is, when the eighth included angle θ8 is equal to the seventh included angle θ7 and equal to θ±γ, the ninth included angle θ9 is equal to 90°; or the ninth included angle θ9 is equal to 90°±2γ; or the ninth included angle θ9 is equal to 180° minus 2 times the seventh included angle θ7. Similarly, when the eighth included angle θ8 is equal to the seventh included angle θ7 and equal to θ, the nine included angle θ9 is equal to 90°, so that the eighth included angle θ8 within the first domain 103a is different from the seventh included angle θ7, so that the third sub-electrode 102 have different transmittances of light wavelength in the first domain 103a and the second domain 103b.

Understandably, in the case that the first sub-electrode 101, the second sub-electrode 102, and the third sub-electrode 103 all have multiple domains, when the included angle between the first branched electrode 1012 and the first main electrode 1011 within at least one domain of the first sub-electrode 101 is different from the included angle between the second branched electrode 1022 and the second main electrode 1021 within at least one domain of the second sub-electrode 102, an included angle between the third branched electrode 1032 of the third branched electrode 1032 and the third main electrode 1031 may be equal to an included angle between the first branched electrode 1012 of the first sub-electrode 101 and the first main electrode 1011; or an included angle between the third branched electrode 1032 and the third main electrode 1031 of the third sub-electrode 103 is equal to an included angle between the second branched electrode 1022 of the second branched electrode 1022, so that the transmittance of the light wavelength of the first sub-electrode 101 is different from the transmittance of the light wavelength of the second sub-electrode 102.

Similarly, the included angle between the third branched electrode 1032 and the third main electrode 1011 within at least one domain of the third sub-electrode 103 is different from the included angle between the first branched electrode 1012 and the first main electrode 1011 within at least one domain of the first sub-electrode 101, and is different from the included angle between the second branched electrode 1022 and the second main electrode 1021 within at least one domain of the second sub-electrode 102. The third sub-electrode 103 has a different transmittance of light wavelength from the transmittances of light wavelength of the first sub-electrode 101 and the second sub-electrode 102.

The included angle between the first branched electrode 1012 and the first main electrode 1011 within the first sub-electrode 101 may be equal to the included angle between the second branched electrode 1022 and the second main electrode 1021 of the second sub-electrode 102. The included angle between the first branched electrode 1012 and the first main electrode 1011 of the first sub-electrode 101 may not be equal to the included angle between the second branched electrode 1022 and the second main electrode 1021 of the second sub-electrode 102.

Furthermore, the included angle between the first branched electrode 1012 and the first main electrode 1011 within at least one domain of the first sub-electrode 101 is different from the optimal included angle θ; and/or the included angle between the second branched electrode 1022 and the second main electrode 1021 within at least one domain of the second sub-electrode 102; and/or the included angle between the third branched electrode 1032 and the third main electrode 1031 within at least one domain of the three sub-electrodes 103 is different from the optimal included angle θ. Both can reduce the optical path difference and increase viewing angle of the display panel and solve color shift problem of the display panel.

The first sub-electrode 101, the second sub-electrode 102, and the third sub-electrode 103 can be formed using a same photomask. There may be no difference between layer thicknesses between the first sub-electrode 101, the second sub-electrode 102, and the third sub-electrodes 103 in order to save manufacturing process and cost.

Please continue to refer to FIG. 1, the display panel is a liquid crystal display panel, and the display panel further includes the following:

a first substrate 104, wherein the first electrode 100 is positioned on one side of the first substrate 104;

a second substrate 105 disposed opposite to the first substrate 104 and maintains a first distance d from the first substrate 104; and liquid crystals 106 positioned between the first substrate 104 and the second substrate 105, and a twist angle of the liquid crystals 106 are greater than or equal to 50° and less than or equal to 90°.

The liquid crystals 106 are doped with a chiral agent to improve the transmittance of the display panel. The first distance d is greater than or equal to 2 micrometers and less than or equal to 5 micrometers. A pitch p of the liquid crystal 106 is greater than or equal to 5 micrometers and less than or equal to 25 micrometers. The optical path difference Δ nd of the liquid crystals 106 is greater than or equal to 300 nm and less than or equal to 600 nm to ensure that a twist angle of the liquid crystal 106 is greater than or equal to 50° and less than or equal to 90°.

Furthermore, the first distance d is greater than or equal to 2.8 micrometers and less than or equal to 4 micrometers. The pitch p of the liquid crystal 106 is greater than or equal to 10 micrometers and is less than or equal to 20 micrometers. The optical path difference Δ nd of the liquid crystal 106 is greater than or equal to 400 nm and less than or equal to 500 nm.

The liquid crystal 106 is injected between the first substrate 104 and the second substrate 105 by inkjet printing, etc. After the first substrate 104 and the second substrate 105 are bonded to form a liquid crystal cell, polymer stabilized vertivally alignment (PSVA) is employed to process the liquid crystal cell, in order to form a pre-tilt angle for the liquid crystal 106 to obtain the display panel. The PSVA processes refer to irradiating the liquid crystal cell with ultraviolet light under a charged condition, so that the liquid crystal 106 is reversed in a certain direction. Ultraviolet light irradiation is employed to polymerize the polymerizable monomer of the liquid crystals 106 to form a certain pretilt angle.

The first substrate 104 is one of an array substrate or a color filter substrate. The second substrate 105 is one of the array substrate or a color filter substrate different from the first substrate 104. Furthermore, the first substrate 104 is an array substrate. The second substrate 105 is a color film substrate.

Furthermore, the first substrate 104 includes a substrate 1041. The first substrate 1041 is positioned on a side of the first electrode 100 away from the liquid crystal 106. The substrate 101 includes a rigid substrate and a flexible substrate. Furthermore, the first substrate 104 further includes a thin-film transistor, an alignment layer, and other unshown portions. The second substrate 105 further includes a second substrate 1051, a second electrode 1052 positioned on the second substrate 1051 close to the liquid crystal 106, an alignment layer, and other unshown portions.

The display panel further includes a sealant 107 between the first substrate 104 and the second substrate 105; a first polarizer 108 positioned on a side of the first substrate 104 away from the second substrate 105; and a second polarizer 109 positioned on a side of the second substrate 105 away from the first substrate 104. Furthermore, a polarization axis of the first polarizer 108 coincides with the first main electrode 1011a. The polarization axis of the second polarizer 109 coincides with the first main electrode 1011b, so that the transmittance of the display panel is maximized.

The present disclosure also provides a display device, including the display panel.

The display device further includes a touch panel which is coupled with the display panel in a built-in or plug-in manner to achieve touch function of the display device.

A display panel and a display device provided by embodiments of the present disclosure. The display panel includes a plurality of first electrodes 100 positioned in a same pixel unit, a plurality of first electrodes 100 including a first sub-electrode 101 and a second sub-electrode 102. The transmittance of light wavelength of the first sub-electrode 101 is different from the transmittance of light wavelength of the second sub-electrode 102, so as to increase the viewing angle of the display panel and solve the problem that the display panel is prone to having color swift.

In the above embodiments, description of each embodiment has its own emphasis. For the part that is not detailed in an embodiment, please refer to the related descriptions of other embodiments.

The display panel and the display device provided by the embodiments of the present disclosure are described in detail hereabove. Specific examples are used to explain the principle and implementation of the present disclosure. The descriptions of the above embodiments are only used for understanding technical solutions and core ideas of the present disclosure. People with ordinary skill in the art should understand that they can still modify the technical solutions described in the foregoing embodiments or equivalently replace some of the technical features. These modifications or replacements do not make the principle of the corresponding technical solutions to be depart from the scope of the technical solutions of the embodiments of the present disclosure.

The invention claimed is:

1. A display panel, comprising:
a plurality of first electrodes positioned in a same pixel unit, wherein the first electrodes comprise a first sub-electrode and a second sub-electrode, the first sub-electrode comprises a first main electrode and a plurality of first branched electrodes connected to the first main electrode, a first included angle is formed between the first branched electrodes and the first main electrode; the second sub-electrode comprises a second main electrode and a plurality of second branched electrodes connected to the second main electrode, and a second included angle are formed between the second branched electrodes and the second main electrode; the first included angle is different from the second included angle, the first included angle is equal to $\theta \pm \alpha$; the second included angle is equal to $\theta$; $\theta$ is the best included angle when the display panel has the best transmittance, and a is an angle margin.

2. The display panel according to claim 1, wherein the first sub-electrode comprises a first domain and a second domain that are adjacent to each other, a third included angle formed between the first branched electrode and the first main electrode within the first domain, and a fourth included angle formed between the first branched electrode within the second domain and the first branched electrode within the first domain; wherein the third included angle is equal to the first angle.

3. The display panel according to claim 2, wherein the fourth included angle is equal to 90°; or the fourth included angle is equal to 90°±2α; or the fourth included angle is equal to 180° minus twice the first angle.

4. The display panel according to claim 2, wherein the first sub-electrode comprises a third domain and a fourth domain that are adjacent to each other, the third domain and the second domain are positioned in a same column, the fourth domain and the first domain are positioned in a same column, an included angle between the first branched electrode and the first main electrode within the third domain is equal to the third included angle, and an included angle between the first branched electrode and the first main electrode within the fourth domain is equal to an included angle between the first branched electrode and the first main electrode within the second domain.

5. The display panel according to claim 1, wherein the second sub-electrode comprises a first domain and a second domain that are adjacent to each other, a fifth included angle formed between the second branched electrode and the second main electrode within the first domain, and a sixth included angle formed between the second branched electrode within the second domain and the second branched electrode within the first domain; wherein the fifth included angle is equal to the second included angle.

6. The display panel according to claim 5, wherein the sixth included angle is equal to 90°.

7. The display panel according to claim 5, wherein the second sub-electrode comprises a third domain and a fourth domain that are adjacent to each other, the third domain and the second domain are positioned in a same column, the fourth domain and the first domain are positioned in a same column, an included angle between the second branched electrode and the second main electrode within the third domain is equal to the fifth included angle, and an included angle between the second branched electrode and the second main electrode within the fourth domain is equal to an included angle between the second branched electrode and the second main electrode within the second domain.

8. The display panel according to claim 1, wherein the first electrodes comprise a third sub-electrode, the third sub-electrode comprises a third main electrode and a plurality of third branched electrodes connected to the third main electrode, and the third branched electrodes and the third main electrode comprises a seventh included angle, the seventh included angle is equal to $\theta \pm \gamma$, wherein $0° \leq \gamma \leq 10°$.

9. The display panel according to claim 8, wherein the third sub-electrode comprises a first domain and a second domain that are adjacent to each other and a third domain and a fourth domain that are adjacent to each other, the third domain and the second domain are positioned within a same column, the fourth domain and the first domain are positioned in a same column, an eighth included angle is formed between the third branched electrodes and the third main electrode within the first domain, the eighth included angle is equal to 0, a ninth included angle is formed between the third branched electrode within the second domain and the third branched electrode within the first domain, the ninth angle is equal to 90°, an included angle between the third branched electrodes and the third main electrode within the third domain is equal to the eighth angle, an included angle between the third branched electrodes and the third main electrode within the fourth domain is equal to an included angle between the third branched electrodes and the third main electrode within the second domain.

10. The display panel according to claim 1, wherein $0° \leq \theta \leq 30°$, or $60° \leq \theta \leq 90°$; and $0° \leq \alpha \leq 10°$.

11. The display panel according to claim 1, wherein the first included angle is equal to $\theta$ and the second included angle is equal to $\theta \pm \beta$; wherein $\theta$ is the best angle when the display panel has the best transmittance, and $\theta$ is an angle margin.

12. The display panel according to claim 1, wherein the first included angle is equal to $\theta \pm \alpha$ and the second included angle is equal to $\theta \pm \beta$; wherein $\theta$ is the best angle when the display panel has the best transmittance, and $\alpha$ and $\beta$ are angle margins.

13. The display panel according to claim 1, wherein the display panel is a liquid crystal display panel, the display panel further comprises:
a first substrate, wherein the first electrode is positioned on a side of the first substrate;
a second substrate positioned opposite to the first substrate and maintaining a first distance from the first substrate;

a liquid crystal positioned between the first substrate and the second substrate, and a twist angle of the liquid crystal is greater than or equal to 50° and less than or equal to 90°.

14. The display panel according to claim 13, wherein the first distance is greater than or equal to 2 micrometers and less than or equal to 5 micrometers.

15. The display panel according to claim 13, wherein a pitch of the liquid crystal is greater than or equal to 5 micrometers and less than or equal to 25 micrometers.

16. The display panel according to claim 1, wherein a light wavelength transmittance of the first sub-electrode is different from a light wavelength transmittance of the second sub-electrode.

17. A display device, comprising
a display panel, wherein the display panel comprises:
a plurality of first electrodes positioned in a same pixel unit, the first electrodes comprising a first sub-electrode and a second sub-electrode, the first sub-electrode comprises a first main electrode and a plurality of first branched electrodes connected to the first main electrode, a first included angle is formed between the first branched electrodes and the first main electrode; the second sub-electrode comprises a second main electrode and a plurality of second branched electrodes connected to the second main electrode, and a second included angle are formed between the second branched electrodes and the second main electrode; the first included angle is different from the second included angle, the first included angle is equal to $\theta \pm \alpha$; the second included angle is equal to $\theta$; $\theta$ is the best included angle when the display panel has the best transmittance, and a is an angle margin.

18. The display device according to claim 17, wherein a light wavelength transmittance of the first sub-electrode is different from a light wavelength transmittance of the second sub-electrode.

* * * * *